Feb. 6, 1934.  F. G. FOLBERTH ET AL  1,945,807
CLUTCH AND BRAKE CONTROL MECHANISM
Filed Aug. 12, 1931  2 Sheets-Sheet 1
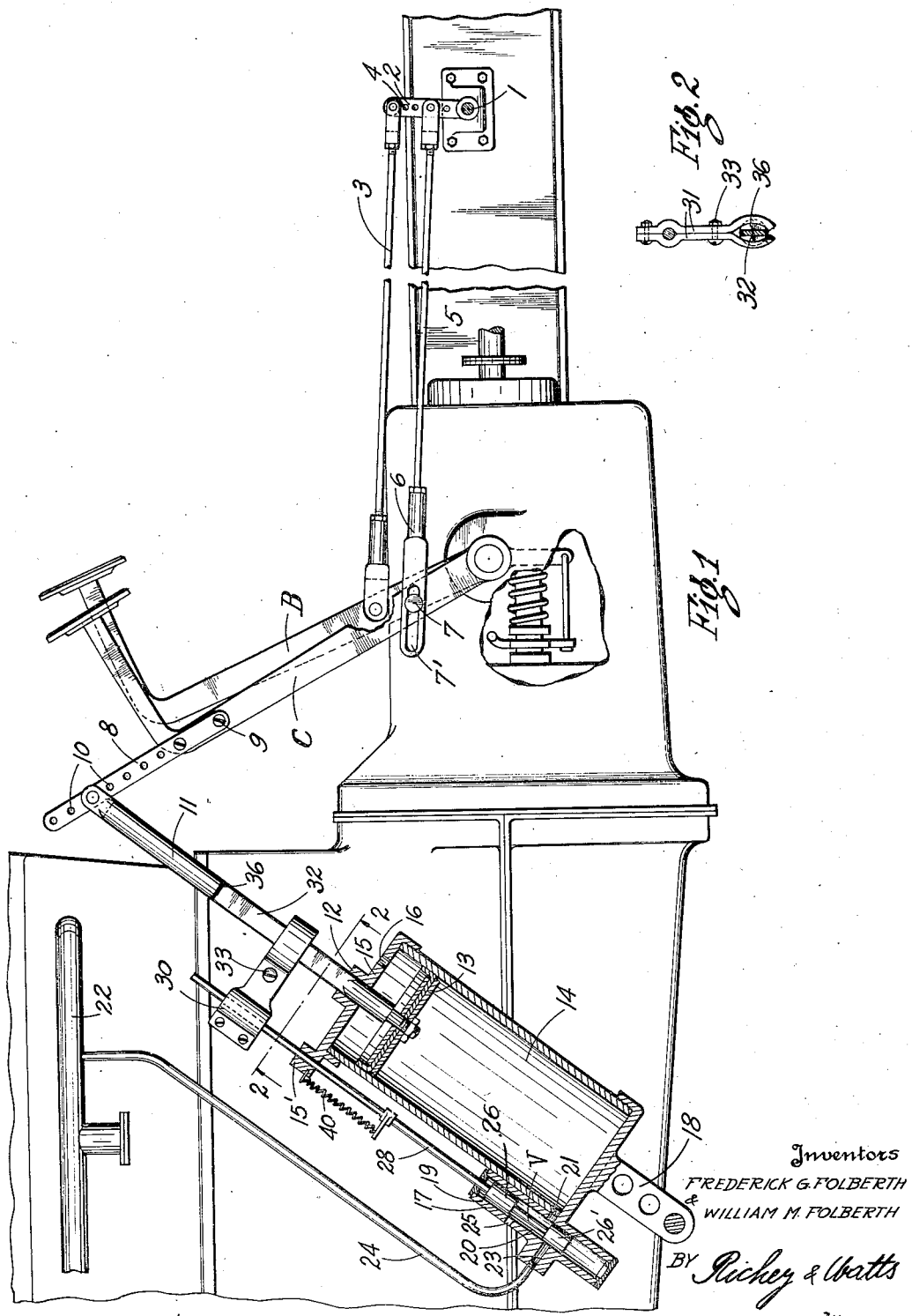
Inventors
FREDERICK G. FOLBERTH
& WILLIAM M. FOLBERTH
By Richey & Watts
Attorneys

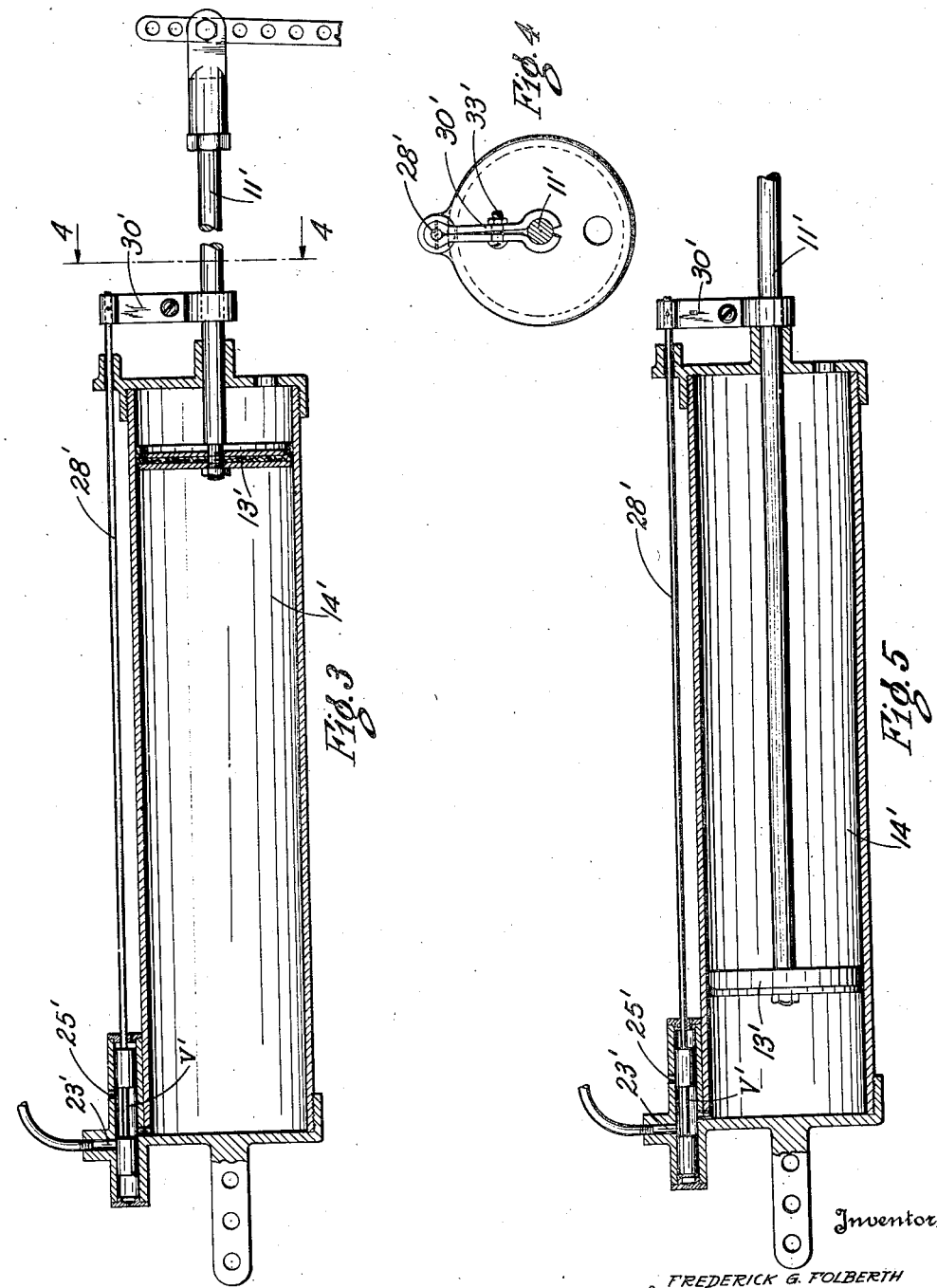

Patented Feb. 6, 1934

1,945,807

UNITED STATES PATENT OFFICE 1,945,807

CLUTCH AND BRAKE CONTROL MECHANISM

Frederick G. Folberth and William M. Folberth, Cleveland, Ohio

Application August 12, 1931. Serial No. 556,624

15 Claims. (Cl. 192—13)

This invention relates to a clutch and brake actuating device. It has to do more particularly with a fluid pressure actuated means arranged to assist the operator in the application of the clutch, as well as the application of the brakes through the clutch pedal.

In our co-pending United States patent applications, Serial No. 595,548, filed Sepember 27, 1929 and Serial No. 483,328, filed September 20, 1930 we have described and claimed an improved automotive vehicle braking system in which fluid pressure actuated means for applying the vehicle brakes are controlled by the vehicle clutch operating mechanism. The present invention also includes a clutch controlled fluid pressure actuated device for exerting a brake applying force.

One object of this invention is to provide a clutch and braking system for automotive vehicles which will reduce the effort and skill required to drive the automobile to a minimum.

Another object of this invention is to provide means for assisting in the operation of the clutch and brake pedals which will facilitate the control of an automotive vehicle, particularly in traffic and on hills and especially when the vehicle is under the control of a novice.

Another object of this invention is to provide a brake actuating device adapted to be controlled by the clutch pedal of an automobile; another object is to provide a fluid pressure actuated operating device for the vehicle clutch; another object is to assist in the application of the brakes by fluid pressure actuated means controlled by the clutch; another object is to provide fluid pressure operated means for actuating the brakes of an automotive vehicle that is so arranged that it does not interfere with the normal foot pressure operation of the brakes.

This invention contemplates the provision of a fluid pressure operating device for vehicle brakes which may be easily and readily attached to standard types of motor vehicles. In the preferred embodiment, a vacuum operated device is mechanically attached to the clutch and pedal by having a suction line connected to the intake manifold of the vehicle engine, thus establishing communication between the manifold and the suction chamber or cylinder of the vacuum device. The suction line is valved, the valve being directly under the control of the clutch pedal and being adapted to be opened when the clutch pedal has been depressed a predetermined amount. Opening of the valve permits reducing the pressure of the air in the cylinder ahead of a piston mechanically connected with the foot pedal and results in the further depression thereof automatically. It is my intention to connect the clutch pedal with the brake pedal in such manner that after the clutch pedal has been depressed a predetermined amount to disengage the clutch and the operation of the suction means has been instigated, the brake mechanism will also be operated on by the suction means, through the clutch pedal, to apply the brakes. This will all be brought out clearly in the detailed description following.

Other objects and advantageous features of this invention will be noted in the accompanying drawings and written description wherein like characters of reference designate like parts, and wherein:

Fig. 1 is a plan view of the preferred form of my clutch and brake actuating device installed on an automotive vehicle;

Fig. 2 is a section taken on line 2—2 of Fig. 1;

Fig. 3 is a vertical longitudinal section through the suction chamber of a slightly modified form of my invention;

Fig. 4 is an end view of the device shown in Fig. 3, taken in the direction indicated by arrows on line 4—4;

Fig. 5 is a similar view to that of Fig. 3, showing the plunger in its opposite position and illustrating the corresponding position of the valve.

With reference to the drawings, we have shown in Fig. 1 a portion of an automobile including the brake and clutch operating pedals and those parts of the vehicle necessary to properly illustrate our invention.

More in particular, the clutch operating lever is designated by the letter "C" and the brake lever by the letter "B", each of the levers being pivotally mounted at the side of the transmission housing in the usual manner. The brake lever B is connected to a brake operating cross shaft 1, through the lever 2 and brake rod 3. It will be noted that the lever 2 is provided with a number of openings 4 so that the connection between the brake rod 3 and the lever may be made at the point which will give the desired leverage.

As for the clutch pedal "C", the connection between the cross shaft 1 is effected through the lever 2 and the rod 5 which carries a slotted link 6 engaging a pin 7 secured to the clutch pedal C adjacent its lower end. Ordinarily operating the brake pedal B under foot pressure will have no effect upon the operation of the clutch pedal C by reason of the slot 7' in link 6. However, when the clutch pedal C has been depressed to the point where the pin 7 reaches the end of its travel in the slot of the link 6, further depression of the pedal C will effect an application of the brakes by pulling the rod 2 forward and thus rotating the cross shaft 1 which may be connected by suitable levers with the brakes of the vehicle. The cross shaft, of course, is of any suitable design supported in suitable bearings disposed in the longitudinal frame members of the vehicle.

It will be noted that the clutch lever C is provided with an extension 8 which may be secured thereto in any manner desired, such as screws 9. A number of spaced openings 10 are provided in the extension 8 so that a connection may be made between a piston rod 11 of our vacuum operated device at the proper point to give the desired leverage.

The piston rod 11 operates in a bearing 12 and is provided with a piston 13 operating within the cylinder 14. The cylinder 14 is provided at one end with an end cap 15 having a vent hole 16. A valve assembly 17 is mounted at the opposite end of the cylinder 14. Suitable brackets, as shown at 18, may be provided for pivotally securing the device to the vehicle.

The operation of the piston to operate the clutch pedal will be clearly understood from the drawings. However, the valve 17 plays an important part in controlling the operation of the piston 13 and consists of a cylinder 19 superposed on the cylinder 14 and having a piston chamber 20 therein that communicates with the cylinder 14 through the passage 21 and with the engine intake manifold 22, through a passage 23 and conduit 24. An atmosphere inlet 25 is also provided that communicates with the chamber 20.

A double ended piston type valve member V, having spaced closure members 26 and 26', is adapted to be reciprocated within the chamber 20 and to connect the interior of the cylinder 14 either to the manifold suction or to the atmosphere through opening 25. In the position shown in Fig. 1 the manifold suction is closed off from the interior of the cylinder 14 and the vent to the atmosphere through the passage 25 is open. The double ended closure member is provided with an actuating rod 28 that extends through a suitable aperture in the upper end wall of the housing 17 and through a suitable bearing in the flange 15' of the cap 15. The rod 28 carries at its outer end a clamp 30. The opposite end of clamp 30 engages the piston rod 11 as seen in Fig. 2. The clamp 30 is adapted to have a relatively loose connection with the rod 11 by means of the clamping fingers 31 that encompass the flat portion 32 of the rod 11, (Fig. 2). A bolt 33 may be provided for tightening the fingers 31 about the piston rod. In actual operation the flat portion of the rod 11 slides through the fingers of the clamping device until the abutment 36 on the rod 11 strikes the fingers and causes the clamp to be moved with the rod 11. It will be noted that a spring or other suitable resilient member 40 is provided to return the clamp and the valve member V to the position shown in Fig. 1. That is, when the clamp is moved toward the bottom of cylinder 14, it is moved against the tension of the spring 40 which tends to move it in a reverse direction as soon as the clutch pedal movement is reversed.

In operation, if we assume that all parts are in their normal positions, that is to say, the clutch is engaged and the brake pedal off, as shown in Fig. 1, the operation of the apparatus is substantially as follows:

When the clutch lever C is depressed, the piston rod 11 is moved downwardly which tends to force the air ahead of the piston 13 through the ports 21 and 25. However, when the abutment 36 on the rod 11 engages with the clamp 30, the rod 28 is moved in a direction to move the closure member 26' and open the line 24 from the manifold to the cylinder 14. Further, the vent 25 is closed by the closure member 26. Of course, suction from the intake manifold reduces air pressure in the cylinder 14 to less than atmospheric pressure which results in a positive downward force being exerted on the reverse face of the piston 13 which tends to further depress the clutch pedal C.

It is desirable that the parts be so adjusted that, simultaneously with the exertion of a pull on the clutch pedal by means of the suction device, the pin 7 will have reached the end of the slot 7' and will be exerting a force on the cross shaft tending to apply the brakes. Further depression of the clutch pedal will, of course, increase the application of force to apply the brakes.

From the above description it will be seen that the apparatus shown in Fig. 1 of the drawings does not interfere with the normal manual operation of either the clutch or the brake. However, when the clutch is fully disengaged by pressure of the operator's foot, the suction device will come into play to assist in the application of the vehicle brakes. We prefer to so proportion the parts that the braking effort thus applied will be relatively light. Thus the apparatus will be particularly useful in holding the vehicle on a slight grade while waiting for a traffic signal to change without the necessity of manually exerting any appreciable force to apply the brakes.

In automotive vehicles, the disengaging of the clutch and the application of the brakes is commonly opposed by means of springs that are connected not only to the levers themselves but in the instance of the brakes are provided to retract the brake band. All of these resilient members exert a certain force which tends to immediately return the levers to idle position when the operator's foot is removed. As soon as the operator releases the pressure of his foot upon the clutch pedal it tends to spring back and the shoulder 36 moves away from the cylinder 14. When this occurs the spring 40 causes the rod 28, the valve member V and the clamping yoke 30 to move in the same direction. This movement shifts the valve 17 and connects the interior of the lower end of the cylinder 14 to the atmosphere, thus permitting the clutch pedal freely to return to normal position.

In Figs. 3, 4 and 5, we have shown a modified form of clutch operating device that is controlled in substantially the same manner as the device shown in Fig. 1. The main difference between these two devices lies in the fact that the device of Fig. 1 is intended to operate the vehicle brake only without affecting the normal clutch operation, and it is resisted in its operation by the combined force of the clutch springs and the various springs employed in the brake system to effect release of the brake. In the modified form of the device we intend to employ the suction means only to assist the operation in disengaging the clutch.

To this end it is necessary that the mechanical connection between the rod 28' and the piston rod 11' be slightly altered to secure the desired application of the intake manifold suction to assist in operating the clutch. In order to accomplish this, the rod 11' differs from the rod 11, shown in Fig. 1, in that it is of constant diameter throughout, especially in that portion where it is engaged by the fingers of the clamp 30'. When the bolt 33' is tightened the fingers frictionally engage with the rod 11' to permit the clamp 30' to be moved therewith and this frictional engagement prevents relative movement between the piston rod and the clamp except when the valve member V' abuts against either end of its cylindrical casing. Hence, when the clutch pedal C is depressed, the closure member V' is immediately moved to uncover the port 23' which subjects the interior of the cylinder 14', ahead of the piston, to suction from the intake manifold and results in the application of a force which greatly assists the operator in the depression of the clutch pedal.

In the embodiment of our invention shown in Figs. 3, 4 and 5, the diameter of the cylinder 14' and the piston 13' is preferably made such that the force exerted on the clutch operating lever is enough to almost, but not quite, overcome the power of the clutch springs. We have found that a force, equal to approximately eighty percent of the strength of the clutch springs, exerted by the vacuum apparatus will result in satisfactory operation. In the operation of this form of our apparatus an initial small downward movement of the clutch pedal moves the piston 13' and the piston rod 11' to the left (Fig. 3). The frictional engagement of the clamp 30' upon the piston rod 11' causes the clamp 30', the rod 11' and the valve closure member V' to be carried to the left with the piston rod 11'. This movement of the valve member V' shuts off the atmospheric connection and connects the interior of the cylinder 14' to the manifold suction through the passage 23'. As soon as this occurs a force, for example, equal to approximately eighty percent of the strength of the clutch springs, will be exerted on the clutch lever to assist in disengaging the clutch. Thus, the operator is relieved of the greater part of the effort necessary to overcome the clutch springs. As soon as the operator relieves his foot pressure on the clutch pedal the balance of power of the clutch springs over the vacuum apparatus will cause the piston rod 11' to be moved to the right. This movement will carry the valve member V' to the right due to the frictional engagement of the clamp 30' upon the piston rod and will immediately vent the left hand end of the cylinder 14' to the atmosphere through the port 25' and shut off the connection to the intake manifold. The clutch springs may then cause the clutch to engage in the usual and normal manner.

Although we have described the illustrated embodiments of our invention in some detail, it will be understood by those skilled in the art that modifications and variations thereof may be made without departing from the spirit of our invention. We do not, therefore, wish to be limited to the exact apparatus shown herein, but claim as our invention all embodiments thereof coming within the scope of the appended claims.

We claim:—

1. A control system for automotive vehicles, including brake operating connections, a clutch operating pedal, means for connecting said clutch pedal with said brake operating connection, a slip joint included in said connecting means, and fluid pressure operated means, controlled by said clutch operating pedal, for exerting a force tending to move said pedal to apply the vehicle brakes when said pedal has been depressed an amount sufficient to disengage the clutch.

2. A control system for automobiles including a clutch operating pedal, a brake operating connection to said clutch pedal including a slip joint and vacuum actuated means connected to said clutch pedal and adapted to be controlled by movement of said clutch pedal to actuate the vehicle brake subsequent to the disengagement of said clutch.

3. A control system for automotive vehicles including a brake pedal, a cross shaft, means for connecting said brake pedal to said cross shaft, a clutch pedal, means including a slip joint for connecting said clutch pedal to said cross shaft, vacuum actuated means adapted to be controlled by the movement of said clutch pedal for moving said brake pedal when said clutch has been depressed a predetermined amount.

4. A control system for automotive vehicles which consists in a clutch pedal, a cross shaft adapted to operate the brakes of said automotive vehicle, means for connecting said clutch pedal to said cross shaft adapted to permit the clutch pedal to be depressed a predetermined amount before said cross shaft is actuated, and vacuum actuated means for exerting a depressing force on said clutch pedal, said means being controlled by said clutch pedal.

5. A control system for vehicles having a brake comprising means for manually operating said brakes, a manually operated clutch operating pedal connected to said brakes and adapted to operate said brakes independently of said manual brake operating means when said clutch operating pedal has been moved a predetermined distance, fluid pressure actuated means connected to said clutch pedal and adapted to exert a force tending to depress said clutch pedal, valve means for controlling said fluid pressure actuated means, and operating connections between said valve means and said clutch pedal.

6. In combination with a vehicle having braking mechanism, fluid pressure operated means for exerting a brake actuating force including a cylinder, a piston in said cylinder, a valve for controlling the flow of fluid to and from said cylinder, a piston rod, and means, frictionally engaging said piston rod, for controlling said valve, said means being slidable with relation to said piston rod.

7. In a control system for vehicles, the combination of a cross shaft adapted to operate the vehicle brakes, a brake pedal, a clutch pedal, connections between said brake pedal and said cross shaft, connections between said clutch pedal and said cross shaft, said last named connections including a slip joint, fluid pressure actuated means adapted to exert a force tending to move said clutch pedal to operate said cross shaft, said fluid pressure actuated means including a cylinder, a piston, a piston rod, and a valve for controlling the flow of fluid to and from said cylinder, said valve being controlled by movement of said piston rod and said piston rod being connected to said clutch pedal.

8. A control system for automobiles including a brake operating cross shaft, a clutch pedal, connections between said clutch pedal and said cross shaft, means for permitting said clutch pedal to be depressed a predetermined amount before said cross shaft is actuated, fluid pressure actuated means adapted to exert a force tending to move said clutch pedal in clutch disengaging direction including a cylinder, a piston in said cylinder, a piston rod secured to said piston and connected to said clutch pedal, a control valve for controlling the flow of fluid to said cylinder, a connecting rod secured to said control valve and means associated with said connecting rod and with said piston rod for actuating said valve when said clutch pedal is operated manually.

9. A control system for automotive vehicles comprising in combination, a brake operating cross shaft, a clutch pedal, means for connecting said clutch pedal and said cross shaft including a slip joint for permitting said clutch to be depressed a predetermined amount and before said cross shaft is operated, means for automatically exerting a depressing force on said clutch pedal during the brake applying portion of the movement, said means including a cylinder, a piston in said cylinder, a connecting rod secured to said piston and to said clutch pedal, a valve which controls the flow of fluid to and from said cylinder, a rod connected to said valve, a clamp connected to said rod having a part encompassing said piston rod, resilient means for urging said clamp in one direction, and a shoulder on said piston rod adapted to engage said clamp to move said valve in the opposite direction.

10. A control system for automotive vehicles including a brake, means for manually operating said brake, a clutch pedal, connections between said clutch pedal and said brake whereby a portion of the movement of said clutch pedal operates said brake, fluid pressure actuated means for exerting a brake applying force during said portion of the movement of said clutch pedal, said fluid pressure actuated means comprising a cylinder, a piston, a piston rod secured to said piston and connected to said clutch pedal, a valve for controlling the flow of fluid to said cylinder, means associated with said valve and with said piston rod for moving said valve in one direction when said clutch pedal is manually depressed, and resilient means for moving said valve in an opposite direction when said clutch pedal is released.

11. In apparatus of the class described, the combination of a manually operable clutch actuating pedal, fluid pressure actuated means connected to said clutch pedal and adapted to exert a force tending to move said pedal in clutch disengaging direction, a valve for controlling said fluid pressure actuated means and mechanical connections between said valve and said clutch pedal whereby the initial movement of said pedal in either clutch engaging or clutch disengaging direction operates said valve.

12. In a control system for automotive vehicles, the combination of a brake, means for actuating said brake, a clutch actuating pedal, connections between said clutch pedal and said brake actuating means adapted to permit said clutch pedal to be moved to disengage the vehicle clutch before said brake actuating means are actuated, fluid pressure actuated means adapted to exert a force tending to move said clutch pedal in clutch disengaging direction, valve means for controlling said fluid pressure actuated means and means for connecting said valve means and said clutch pedal whereby the initial movement of said clutch pedal in either clutch engaging or clutch disengaging direction moves said valve means.

13. In a control system for automotive vehicles, the combination of a brake, means for actuating said brake, a clutch actuating pedal, connections between said clutch pedal and said brake actuating means adapted to permit said clutch pedal to be moved to disengage the vehicle clutch before said brake actuating means are actuated, fluid pressure actuated means adapted to exert a force tending to move said clutch pedal in clutch disengaging direction, said fluid pressure actuated means including a cylinder, a piston in said cylinder, a piston rod secured to said piston and operatively connected to said clutch pedal, a control valve for controlling the flow of fluid to said cylinder, a connecting rod secured to said control valve and means associated with said connecting rod and with said piston rod for actuating said valve when said clutch pedal is manually operated.

14. In apparatus of the class described, the combination of manually operable clutch operating mechanism, fluid pressure actuated means connected to said clutch operating mechanism and adapted to exert a force tending to move said clutch operating mechanism in clutch disengaging direction, a valve for controlling said fluid pressure actuated means and mechanical connections between said valve and said clutch operating mechanism whereby the initial movement of said clutch operating mechanism in either clutch engaging or clutch disengaging direction operates said valve.

15. In combination, a manually operable lever, spring means for moving said lever in one direction, fluid pressure actuated means adapted to exert a force tending to move said lever in the other direction, said spring means being adapted to exert a greater force than said fluid pressure actuated means, a valve for controlling said fluid pressure actuated means and connections between said valve and said lever whereby the initial movement of said lever in either direction will operate said valve.

FREDERICK G. FOLBERTH.
WILLIAM M. FOLBERTH.

DISCLAIMER 1,945,807.—*Frederick G. Folberth* and *William M. Folberth*, Cleveland, Ohio.
CLUTCH AND BRAKE CONTROL MECHANISM. Patent dated February 6, 1934.
Disclaimer filed December 9, 1935, by the patentees.

Hereby enter this disclaimer to claims 11 and 14 which are in the following words, to wit:

"11. In apparatus of the class described, the combination of a manually operable clutch actuating pedal, fluid pressure actuated means connected to said clutch pedal and adapted to exert a force tending to move said pedal in clutch disengaging direction, a valve for controlling said fluid pressure actuated means and mechanical connections between said valve and said clutch pedal whereby the initial movement of said pedal in either clutch engaging or clutch disengaging direction operates said valve."

"14. In apparatus of the class described, the combination of manually operable clutch operating mechanism, fluid pressure actuated means connected to said clutch operating mechanism and adapted to exert a force tending to move said clutch operating mechanism in clutch disengaging direction, a valve for controlling said fluid pressure actuated means and mechanical connections between said valve and said clutch operating mechanism whereby the initial movement of said clutch operating mechanism in either clutch engaging or clutch disengaging direction operates said valve."

[*Official Gazette January 14, 1936.*]